United States Patent [19]
Winkelmann

[11] 3,953,741
[45] Apr. 27, 1976

[54] STEPWISE CONTROL FOR TWO-STEP CONTROL WITH SWITCHING STAGES

[75] Inventor: Urs Winkelmann, Jona, Switzerland

[73] Assignee: Stata-Control System SCS AG, Stata, Switzerland

[22] Filed: Dec. 19, 1974

[21] Appl. No.: 534,289

Related U.S. Application Data

[63] Continuation of Ser. No. 315,308, Dec. 15, 1972, abandoned.

[30] Foreign Application Priority Data

Dec. 17, 1971 Switzerland.................. 18468/71

[52] U.S. Cl................................... 307/87; 307/102; 317/137
[51] Int. Cl.²........................... H02J 1/00; H02J 3/00
[58] Field of Search............ 307/81, 87, 102, 29–41; 290/30 R, 4 A; 317/137, 139, 135 A; 318/102, 561

[56] References Cited
UNITED STATES PATENTS

| | | | |
|---|---|---|---|
| 3,235,743 | 2/1966 | Ryerson et al.................... | 307/87 |
| 3,339,079 | 8/1967 | Kessler............................. | 307/81 |
| 3,428,821 | 1/1969 | Ruffieux........................... | 307/87 |
| 3,609,388 | 9/1971 | Hemmenway..................... | 307/87 |

*Primary Examiner*—David Smith, Jr.

[57] ABSTRACT

A stepwise control for two-step control operations comprising a series of switching stages which for each stage value of a control magnitude as the input magnitude switches-on a corresponding stage value of a physical output magnitude as an adjustment magnitude and each of which possess switching hysteresis, the width of which is defined by the difference of the values of the input magnitude for switching-in and switching-off the switching stage, there being present a smallest stage value of the output magnitude and the value of the output magnitude of a subsequent stage is greater by the amount of such smallest stage value than that of the preceding stages and the total value of the output magnitude is divided over the switching stages into such partial values that by switching-on and/or switching-off the switching stages it is possible to portray the individual stage values of the output magnitude. The switching stages possess switching hystereses having hysteresis widths which differ from one another, and the switching stages can be actuated by means of switch-on values and switch-off values of the input magnitude which respectively increase and decrease for the individual switching stages in the sequence of their hysteresis widths. Both of the first two switching stages respectively switch the smallest stage value of the output magnitude and the partial value of the output magnitude of each further switching stage is not greater than the sum of the partial values of the output magnitude of the respective momentarily preceding switching stages of the series.

8 Claims, 7 Drawing Figures

STEPWISE CONTROL FOR TWO-STEP CONTROL WITH SWITCHING STAGES

This is a continuation of application Ser. No. 315,308, filed Dec. 15, 1972, now abandoned.

BACKGROUND OF THE INVENTION

The present invention relates to a new and improved construction of stepwise control or regulator for on-off or two-step control incorporating switching stages, which for each stage value of a control magnitude as the input magnitude of the corresponding stage value switches-in a physical output magnitude as an adjustment magnitude and each of which possesses switching hysteresis, the width of which is determined by the difference of the magnitude of the input values for switching-in and switching-out the switching stages. Further, there is present a smallest stage value of the output magnitude and the output magnitude value of a subsequent stage always is greater by this smallest stage value than the preceding stage and the total value of the output magnitude at the switching stages is subdivided into such partial values that through switching-in and/or switching-out the switching stages there can be portrayed the individual stage values of the output magnitude.

As is well known in a two-point or on-off control, the reference value continuously alternately exceeds or drops below the regulating or control magnitude, so that the course of the control produces a continuous oscillation of the magnitude to be controlled. For the control equipment and the control or regulation function there are of significance in this regard the oscillation period and the amplitude of the control oscillations. The oscillation period determines the switching frequency during the control and is therefore essential for the longevity of the switches containing, for instance, protective or overload relays. The amplitude is represented by the difference between the upper and lower boundary values of the magnitude to be controlled and which occur during the control operation and indicate the amount by which the reference value has been exceeded or fallen below. In the case of an on-off control at a control system with equalization and recovery or dead time, the amplitude of the control oscillation is dependent upon the hysteresis width and by virtue of the parameters of the control system (recovery time, time-constant, gain) upon the speed of change of the control magnitude. The greater the width of the hysteresis and the speed of change of the control magnitude, that is to say, in the case of a control system of predetermined recovery time of the magnitude of the switched-in and switched-out value of the output magnitude, that much greater is also the amplitude of the control oscillations. In order to be able to obtain small amplitudes of the control oscillations, there is therefore permitted to be continuously switched-in a certain proportion of the output magnitude as the base load and there is always switched-in and switched-out, for control purposes, only a small portion thereof. For such control operations there have been developed stepwise controls or regulators.

With the known decimal stepwise controls, the total value of the output magnitude is uniformly divided over a number of switching stages, so that each one cuts-in and cuts-off the same stage value of the output magnitude. If with a constant disturbance magnitude there is required a value of the output magnitude which is exactly equal to the number of stage values in order to maintain a condition of the control system at the stepwise control, which condition is determined by the reference value of the control magnitude, then by means of the input magnitude there is switched-in through the agency of a network, just so many switching stages in succession until there is attained the required value of the output magnitude. After this start-up phase, there does not occur any further control. If for a constant disturbance value there is required, for maintaining the control system condition, a value of the output magnitude which is between two stage values, in other words is composed of a number of stage values and a fraction of a stage value, then, owing to the control magnitude in the start-up phase, there are switched-in a corresponding number of switching stages and the still missing fraction is maintained, in that the next successive switching stage is periodically switched-in and switched-out, wherein during the oscillation period of the control oscillation which adjusts itself this switching stage is respectively once switched-in and switched-out and there is a behavior of the switch-in time of the switching stage to the oscillation period like the fraction to the stage value of the output magnitude. Small changes in the disturbance magnitude only alter the switch-in time of the switching stage within the oscillation period. Larger changes in the disturbance magnitude produce a behavior of the control like during the start-up phase, that is to say, the switching stages are switched-in and the switched-out respectively. In consideration of a P-regulator (proportional control or regulator) it is therefore possible to define for the stepwise control a proportionality region, and specifically a static proportionality region or a static proportionality band, the width of which is defined by the amount of the deviation of the control which is necessary in order to place all of the switching stages of the control out of the switched-out state into the switched-in state, and a dynamic proportionality region or a dynamic proportionality band, the width of which corresponds to the value of the control deviation which is determined by the cut-on point (or cut-off point) for two successive switching stages. The proportionality regions, just as the amplitude of the control oscillations, can be defined in terms of units of the input magnitude of the control and it is apparent that the dynamic proportionality region can not be greater than the amplitude of the control oscillation, otherwise during the control more than one switching stage will be switched and the control will become instable. The width of the dynamic proportionality region is also dependent upon the hysteresis width of the associated switching stages. Due to the tolerances of the components of the switching stages, their hysteresis width is practically never equal, so that with the decimal stepwise control there are also present different widths of the dynamic proportionality regions, which is undesirable for certain controls.

The smaller the control width for a given adjustment region, that is to say, the smaller the width of the dynamic proportionality region for a given static proportionality region, the more switching stages are required. It can happen that for control functions with a decimal stepwise control, there are necessary for instance thirty and more switching stages. This is uneconomical and a considerable drawback of the decimal stepwise control, particularly if it is considered the expenditure of hardware at the input network also increases as a function of the number of switching stages. Since with the decimal stage control the total value of the output magnitude is uniformly subdivided over its switching stages and during the control operation always only one switching stage and therefore only a corresponding small partial amount of the output magnitude is switched-in and switched-out, the large number of switching stages of such control also can be of advantage, for instance when the output magnitude is a high electrical output. Thus, for the example under consideration with an output magnitude of, for instance, 30 kW during the control via the one switching stage always only 1 kW is switched-in and switched-out and thus the network is only slightly loaded.

The number of required switching stages can be reduced in that the total value of the output magnitude can be divided according to a binary code over the individual stages. Such distribution of the output magnitude occurs with the known binary stepwise controls. In accordance with the desired width relationship of the dynamic to the static proportionality region or the desired relationship of the control width to the adjustment width, in the case of the binary stepwise control, the total value of the output magnitude is subdivided into $2^n - 1$ equal stage values, wherein $n$ represents the number of required switching stages. With each switching stage there is associated a partial value of the output magnitude, which is equal to $2^{n-1}$ P, wherein $n = 1,2,3 ...$, the stage number, and P is the stage value of the output magnitude. With a given relationship of the control width to the adjustment width of approximately for instance 1:30 there is thus required for a binary stepwise control 5 switching stages ($2^5 - 1 = 31$). The stage value P of the output magnitude amounts to 1/31 of its total value and the individual switching stages have associated therewith the output magnitude-partial values 1P, 2P, 4P, 8P and 16P, that is to say, 1/31, 2/31, 4/31, 8/31 and 16/31 of the total value of the output magnitude. The switching stages are switched by the "decimal" prevailing input magnitudes via an input network which, for each stage value of the input magnitude, switches-in those switching stages whose partial values of the output magnitudes collectively produce the corresponding stage value. Since for a given stage value the input magnitude of a number of switching stages must be generally simultaneously switched (for instance for the input stage 7 the switching stages 1/31, 2/31, and 4/31) the construction of the input network is more complicated than in the case of the decimal stepwise control and the switching frequency for the individual switching stages is greater. The switching stages themselves (motor or electromagnetic stage switches) of a binary stepwise control do not differ from that of a decimal stepwise control and also the course of the control for a control system with a binary stepwise control essentially corresponds to the control course of one with decimal stepwise control. If for maintaining a control system condition, there is required for instance as much as one-half of the value of the output magnitude, then for instance with a 30-stage decimal stepwise control the first 15-switching stages are switched-in, with a 5-stage binary stepwise control, on the other hand, there are switched-in the first four switching stages, which collectively amount to 15/31, that is to say not quite one-half of the value of the output magnitude, and the fifth switching stage, at which with 16/31 there is dispensed with more than one half of the output magnitude, is alternately switched-in and switched-out via the input network. With the binary stepwise control, it is no longer possible to state that during the control a base load is continuously maintained switched-in, rather in the most unfavorable situations about 50 percent of the value of the output magnitude is continuously switched in and switched-out. This is particularly then disadvantageous if, for instance, the output magnitude, as mentioned, constitutes a high electrical output, since the network during the control operation is strongly loaded. Furthermore, with the binary stepwise control, the dynamic proportionality region does not possess a uniform width, which likewise can be disadvantageous.

Generally, it is therefore necessary for a given control problem to initially decide whether advantageously there should be employed a decimal or a binary stepwise control.

SUMMARY OF THE INVENTION

It is therefore a primary object of the present invention to provide a stepwise control for on-off regulation with switching stages, which, over the entire adjustment region through switching-in and switching-out one and the same switching stage with the smallest partial value continuously controls the output magnitude, wherein the partial values of the output magnitudes at least of some of its switching stages can have different values.

Now in order to implement this object and others which will become more readily apparent as the description proceeds, the invention resides in the features that the switching stages exhibit switching hystereses with different hysteresis widths from one another and can be actuated by cut-in values and cut-off values of the input magnitudes which increase and decrease respectively for the individual switching stages in the sequence of their hysteresis widths, and that both of the first switching stages respectively switch the smallest stage value of the output magnitudes and the output magnitude-partial value of each further switching stage is not greater than the sum of the output magnitude-partial value of the respectively preceding switching stages of the series.

For the second and each further switching stage, the hysteresis width can increase by a constant value from stage to stage, whereby also the switch-in or cut-in value as well as the switch-out or cut-off value of such stage, in the sequence of its hysteresis width, can increase and decrease respectively by a constant value from stage to stage.

Instead of the foregoing, it is possible for the second and each further switching stage to have the hysteresis width, from stage to stage, increase by an amount which is always proportional to the output magnitude-partial value switched by the preceding switching stage, whereby also the switch-in value as well as the switch-out value of such stages can increase and decrease respectively by an amount proportional to the momentary output magnitude-partial value switched by the preceding switching stage.

Each of the stages following the first two switching stages, which each possess the respective smallest output magnitude stage value, can have associated therewith an output magnitude-partial value which for each of such stages is equal to the sum of the output magnitude-partial values of all of the momentary preceding switching stages of the series, so that for the individual switching stages of the control there result the output magnitude-partial values 1P, 1P, 2P, 4P, 8P, if P designates the smallest stage value of the output magnitude.

The individual switching stages of the stepwise control preferably contain a respective switching device for switching-in and switching-out a partial value of the output magnitude and a control device responsive to the input magnitude for actuating the switching device with adjustable switch-in value and adjustable switch-out value for the stage. The control devices can be coupled with an input element in order to be able to deliver at the same time to all of the control devices the input magnitudes, whereby advantageously the input magnitude for the control deviation null at which the actual value is equal to the reference value of the magnitude to be controlled, possesses a certain average value, and for each positive and negative control deviation, at which the actual value is greater or smaller respectively, than the reference value, possesses a value which is correspondingly greater or smaller respectively, or smaller or greater respectively, than the average value of the input magnitude in accordance with the momentary value of the control deviation.

A time-delay element can be coupled between the control devices of the switching stages and the input element, so that for a sudden increase and/or decrease of the input magnitude at the output of the input element, the input magnitudes at the inputs of the control devices can increase and decrease with a certain time-delay and successively actuate the switching stages affected by the change of the input magnitudes.

The time-delay element can possess a greater delay action for a sudden change in the input magnitudes for switching-in the switching stages than for a sudden change in the input magnitudes for switching-out the switching stages.

The stepwise control can be of optional design, for instance can be an electrical stepwise control with a voltage as the input magnitude and with a respective overload relay or relay at its individual switching stages and controlled by the input voltage, or for instance can be a pneumatic stepwise control with gas pressure as the input magnitude and pneumatic switches which can be actuated by the gas pressure.

BRIEF DESCRIPTION OF THE DRAWINGS

The invention will be better understood and objects other than those set forth above, will become apparent when consideration is given to the following detailed description thereof, undertaken by way of example with respect to a temperature control. Such description makes reference to the annexed drawings wherein.

DETAILED DESCRIPTION OF THE PREFERRED EMBODIMENTS

Figure 1:
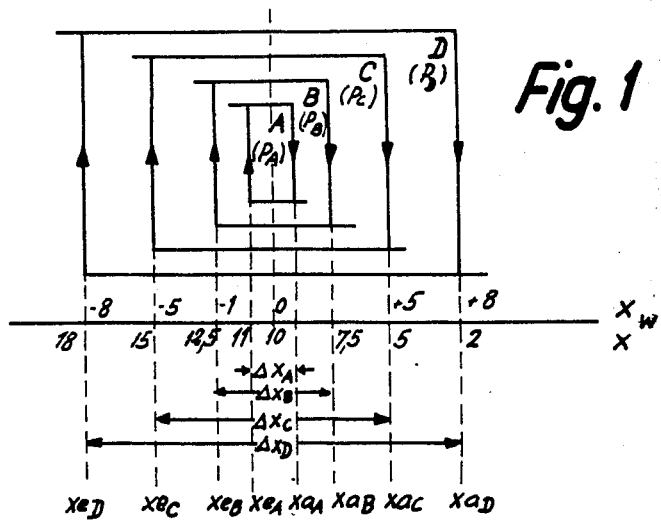
FIG. 1 schematically illustrates the adjustment characteristic of a four-stage control according to the invention.

The behavior of a two-point or on-off switch is normally depicted in a graph portraying its adjustment characteristic, in which in a coordinate system there is plotted along the abscissa the control deviation $x_w$ and along the ordinate the adjustment magnitude $y$ of both step functions for the switching-in and switching-out operations. Both step functions collectively produce the switching hysteresis of the switch. FIG. 1 illustrates a similar diagram for the adjustment characteristic of a four-stage regulator or control according to the invention, wherein initially the adjustment magnitudes are not taken into consideration. Along the abscissa there are plotted values for the control deviation $x_w$, which assume positive values when the actual value is greater than the reference value for the magnitude to be controlled, and negative values when the actual value is smaller than the reference value. Beneath these values there are plotted corresponding values for the input magnitude $x$ of the stepwise control. The input magnitude $x$ can be, for instance, an electrical DC-voltage; in FIG. 1 the input magnitude only has positive values for all control deviations with an average value ($x = 10$) for the control deviation null. There have been plotted above the abscissa the step functions for cutting-in and cutting-off the four switching stages A,B,C,D. The switching stages A,B,C,D, possess switching hystereses having hysteresis widths $\Delta x_A$, $\Delta x_B$, $\Delta x_C$, $\Delta x_D$ which differ from one another. For the individual switching stages both the switch-in values as well as also the switch-out values are staggered in the sequence of their hysteresis widths with distances increasing from the average value ($x=10$) of the input magnitude corresponding to the control deviation null so that all switch-in or cut-in values are located to one side of the average value of the input magnitude and all switch-out or cut-off values at the other side of such average value of the input magnitude and do not intersect one another in the diagram representing the step functions. In the graph of FIG. 1 the switching stage A possesses the smallest hysteresis width ($\Delta x_A = 2$) with the switch-in value at $x = 11$ and the switch-out value at $x = 9$ and the switching stage D possesses the greatest hysteresis width ($\Delta x_D = 16$) with the switch-in value at $x=18$ and the switch-out value at $x=2$. Furthermore, in FIG. 1 the switch-in value and the switch-out value of each switching stage is located symmetrically with respect to the average value of the input magnitude, something which however is not absolutely necessary.

With greatest negative control deviation, that is with the greatest value ($x=18$) of the input magnitude, all four switching stages A,B,C,D, are switched-in and accordingly the actual value approaches rather rapidly the reference value of the magnitude to be controlled, wherein the input magnitude in the graph of FIG. 1 strives from the left towards its average value ($x=10$). Notwithstanding decreasing input magnitude, the switching stages remain switched-in until the actual value exceeds the reference value and the control deviation becomes positive. If the actual value further increases, wherein the value of the input magnitude $x$ always becomes smaller, then the switching stages A,B,C,D, switch-off in the sequence of their hysteresis widths, in other words first the switching stage A (at $x=9$), then the switching stage B (at $x=7.5$), then the switching stage C (at $x=5$) and finally the switching stage D (at $x=2$). If the input magnitude x increases starting from its smallest value ($x=2$) then the switching stages A,B,C,D, remain switched-off until the input magnitudes exceed their average value ($x=10$). With further increasing input magnitudes, the switching stages A,B,C,D, again cut-on or switch-in in the sequence of their hysteresis widths and specifically in the illustrated diagram always first the switching stage A (at $x=11$), then the switching stage B (at $x=12.5$), then the switching stage C (at $x=15$) and finally the switching stage D (at $x=18$). The distribution of the output magnitudes (adjustment magnitude) y at the individual switching stages and the function of the control will be more fully described hereinafter, for instance by way of example with a temperature control, wherein reference will be made to FIGS. 2 to 4.

Figure 2:
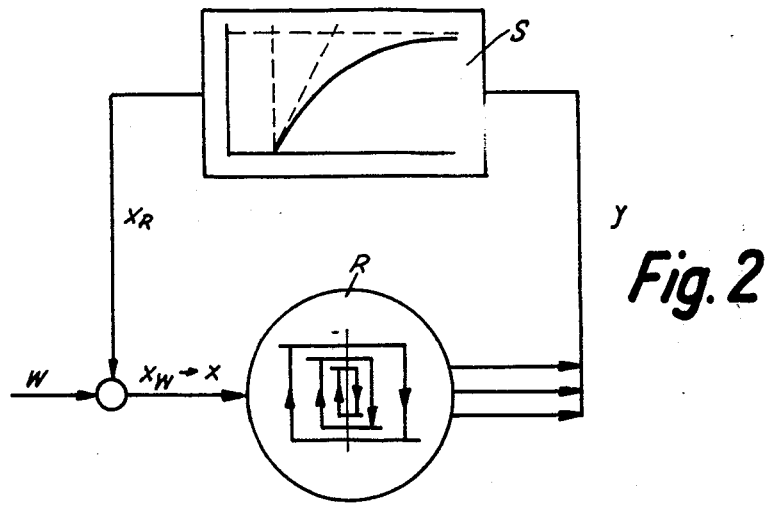
FIG. 2 is a block circuit diagram of a control circuit with a control designed according to the teachings of the invention and a control system of the first order.

FIG. 2 illustrates a block circuit diagram of a suitable control circuit in which the control or regulator R is designated by a graphic symbol similar to the diagram of FIG. 1 as a stepwise control in accordance with the invention. The control system S is of the first order with a recovery or dead time, which has been represented by the indicated transient function. The individual switching stages of the stepwise control can possess a respective protective or overload relay. The protective relays cut-on and cut-off heating coils, so that the output magnitude (adjustment magnitude) y of each switching stage is an electrical output. The input magnitude $x$ is an electrical voltage, which for instance is delivered by a temperature feeler of conventional design, wherein each protective relay is energized and deenergized by a different voltage value. Furthermore, in the block circuit diagram of FIG. 2 the control magnitude has been represented by reference character $x_R$, the reference value by reference character $w$ and the control deviation by reference character $x_w$.

Figure 3:
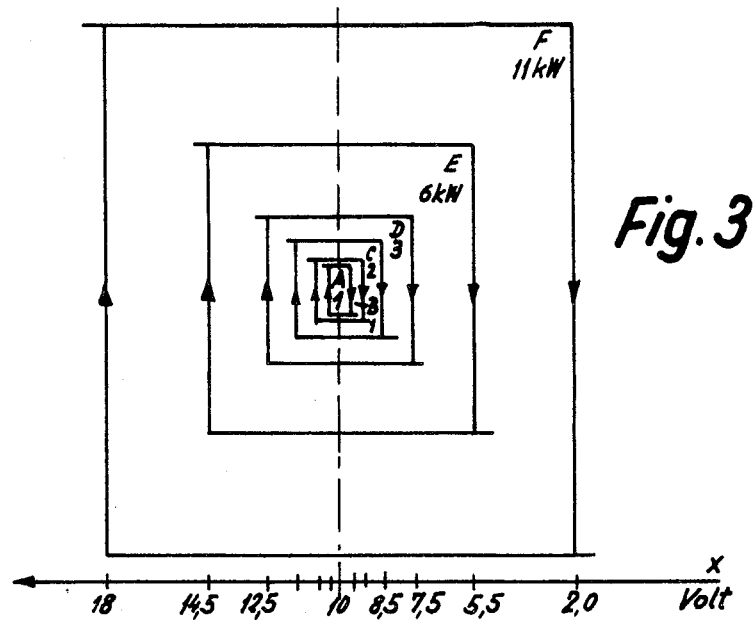
FIG. 3 illustrates an adjustment characteristic of, for instance, a control employed for temperature regulation in the control circuit of FIG. 2.

The control can have, for instance, six switching stages A ... F, which collectively switch, as the output magnitude y, 24 kW power. For the dynamic portionality region there should be provided a smaller stage value of the output magnitude of 1 kW. FIG. 3 illustrates, for this embodiment, a diagram analogous to the showing of FIG. 1. The switch-in and switch-out voltages (input magnitude $x$) for the protective relays of the switching stages and therefore their hystereses width have been determined as follows:

Switch-in Voltage: A 10.4; B 10.8; C 11.5; D 12.5; E 14.5; F 18.0 Volts
Switch-out Voltage: A 9.6; B 9.2; C 8.5; D 7.5; E 5,5; F 2.0 Volts
Hysteresis width: A 0.8; B 1.6; C 3.0; D 5.0; E 9.0; F 16.0 Volts.

Figure 4:
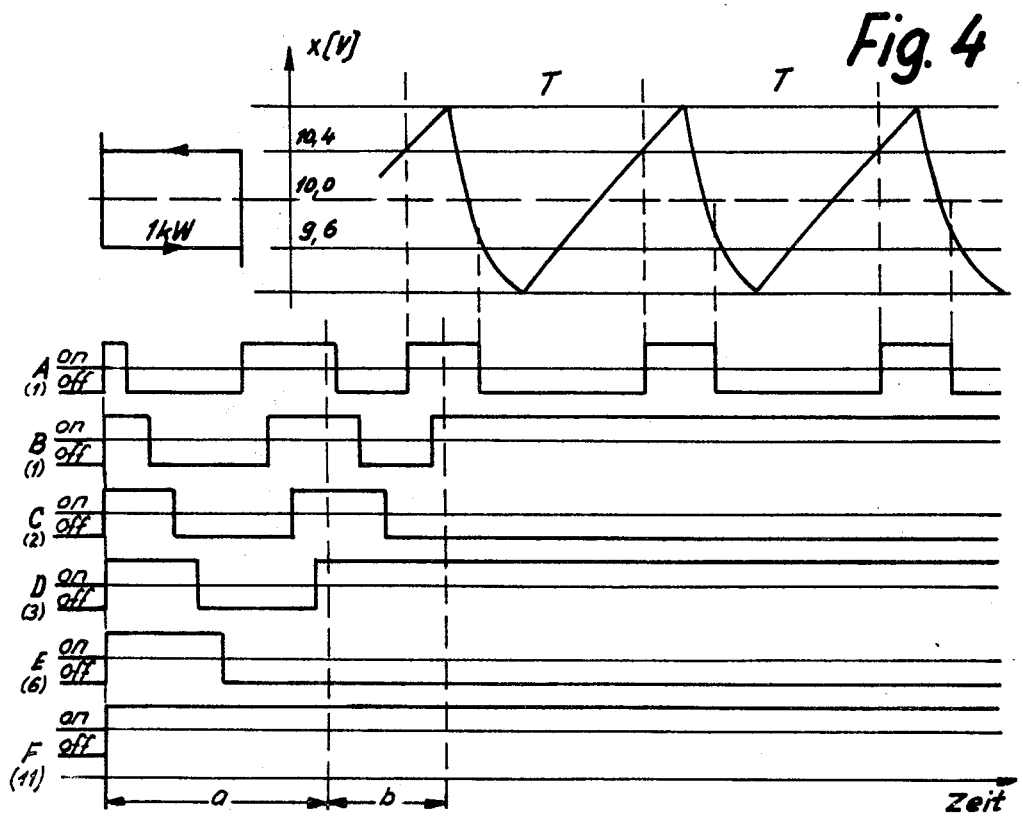
FIG. 4 is a graph illustrating the control operation.

The switching stages have required, just as for a stepwise control according to the invention, switching hystereses of increasing width. According to the invention the total width of the output magnitude (24 kV) furthermore should be divided over the individual switching stages such that the first two switching stages each switch the smallest stage value of the output magnitude and the partial value of each further stage is not greater than the sum of the partial values of the output magnitude of the momentarily preceding switching stages of the series. Accordingly, the total power of 24 kW is subdivided over the six switching stages for instance as follows: Switching stage A 1 kW, switching stage B 1 kW, switching stage C 2 kW, switching stage D 3 kW, switching stage E 6 kW and switching stge F 11 kW. In order to explain the mode of operation of the control there is assumed, for instance, that for maintaining a temperature adjusted by reference value there is required a power of 15.3 kW. In the graph of FIG. 4 there has been illustrated the time course of the control operation in schematic fashion.

Upon switching-in the control circuit the input magnitude $x$ has a high value, so that all six switching stages are switched-in and heated with 24 kW. The temperature reaches the reference value and exceeds such, wherein the input potential or voltage (inpt magnitude) decreases and the protective relays cut-off the switching stages A,B,C,D. Since the heating load or power of both of the last two switching stages with collectively 17 kW is still too high, the input voltage drops further, and at 7.5 volts also cuts-off the next to last stage E. Owing to the low heating power of the still switched-in last switching stage F the actual temperature begins to drop and falls below the reference value and the switching stages A,B,C, are switched-in by the now increasing input voltage. The turned-on switching stages A,B,C,F, collectively provide a heating load of 15 kW, which however is still too slight, so that the input voltage must further increase and at 12.5 volts also switches-in the switching stage D. This region which encompasses the decrease and increase of the input magnitude has been designated in FIG. 4 by reference character $a$. The now switched-in heating load of 18 kW is too high and the inpt voltage again begins to decrease and specifically, without the switching stage E having been switched-in. With decreasing input voltage the switching stages A,B, and, since the resulting heating load of 16 kW is still too high, also the switching stage C, are switched-off. There are now switched-in the switching stages D and F with collectively 14 kW heating power, which now however is too small, so that the input voltage again increases and at 10.4 volts causes the protective relay of the switching stage A to respond. With switching-in of the switching stage A the heating load amounts to 15 kW, which owing to the required heating load of 15.3 kW is not yet sufficient, so that at 10.8 volts also the switching stage B closes. This second region which again encompasses an increase and decrease of the input magnitude has been designated in FIG. 4 by reference character $b$. With the switching stages F,D,B,A, there has been switched-in now a heating power of 16 kW, which is too high, so that the protective relay again switches-off the switching stage A. This produces a heating load of 15 kW, which again is too low, and with increasing input voltage again switches-in the switching stage A.

The switching stages F,D,B, with collectively 15 kW (base load) which remain switched-in at the start-up phase during the regions or sections $a$ and $b$, that is to say, during twice the descent and ascent of the oscillations of the input magnitude, remain continuously switched-in and only the switching stage A with the smallest stage value of the output magnitude (1 kW)

continuously switches off and on, so that there is produced a control oscillation, the oscillation period of which, as previously mentioned, is dependent upon the hysteresis width of the switching stage and the parameters of the control system (FIG. 4). During each control oscillation (oscillation period T), with the preceding example, the switching stage A is turned-on during 3/10 T and turned-off during 7/10 T. The control operation for each random heating power value between 0 and 24 kW is carried out in an analogous manner. Each time the base load is automatically adjusted during the start-up phase and the control takes place by switching-in and switching-out the switching stage A having the smallest hysteresis width. The distribution of the output magnitude (24 kW) over the six switching stages can also occur with different partial values or amounts, provided only that the aforementioned conditions are fulfilled. Thus, for instance, the switching stages could carry out their switching operations in the following manner for the stages hereinafter mentioned: A 1 kW, B 1 kW, C 2 kW, D 4 kW, E 8 kW and F 8 kW or A 1 kW, B 1 kW, C 1 kW, D 3 kW, E 6 kW and F 12 kW. It should be apparent that the lowest stage value or number can be realized with a distribution wherein both of the first switching stages each switch the lowest stage value of the output magnitude and the partial value of each further stage is equal to the sum of the partial values of the output magnitude of the momentarily preceding switching stages of the series. This would constitute a distribution, which starting from the second switching stage, would occur according to a binary code. The other boundary situation, that is to say the greatest stage value or number could be realized when each switching stage has associated therewith the same partial value of the output magnitude. This corresponds to a decimal stepwise switch, wherein the stepwise switch of the invention possesses the advantage, in contrast to the known decimal stepwise or stage switches, that the input network can be designed much simpler and additionally is only always regulated by the first switching stage. With a pregiven total value of the output magnitude (for instance 24 kW) and pregiven number of stages (for instance switching stages A ... F) there is maintained with binary distribution of the output magnitude the smallest control width (dynamic proportionality region) and the greatest resolution capability respectively. In the given example the lowest stage value of the output magnitude, instead of amounting to the value 1 kW, could only amount to 0.75 kW and there would be associated with the individual switching stages the partial values A 0.75 kW, B 0.75 kW, C 1.5 kW, D 3.0 kW, E 6.0 kW, F 12.0 kW.

In the case of an on-off or two-point control the course of the control operation, as previously mentioned, constitutes a continuous oscillation. If in the preceding control example the switching stage A switches-off, then the temperature still increases to an upper boundary value and therefore the input voltage decreases to a lower boundary value, before reversal occurs In corresponding manner during switching-in of the switching stage A there is realized a lower boundary value of the temperature and an upper boundary value of the input voltage. The difference of such input voltage-boundary value (boundary value of the input magnitude) produces the amplitude of the control oscillation. So that the control or regulator will function in a stable manner the switch-in value and switch-out value of the input voltage for the switching stage B must be at least somewhat greater or lower respectively, than the associated boundary value, that is to say the hysteresis width of the second stage B must be at least somewhat greater than the amplitude of the control oscillation. This is also true for the other switching stages of the stepwise control, in other words for the start-up phase. During switching of the switching stage E there is, for instance, switched-in and switched-out respectively 6 kW in the precedingly described control example. There is realized an upper and lower stage boundary value of the input magnitude and the switch-in value and switch-out value for the next greater switching stage (switching stage F) must be at least somewhat greater than the upper or less than the lower stage boundary value, in order that the start-up phase does not become instable. The momentary height of the boundary value for the individual stages or the "over oscillation" at the switching stages is dependent upon the parameters of the control system (dead time, time factor) and upon the magnitude of the partial value of the output magnitude switched by the momentary switching stage, the amplitude of the control oscillation and the hysteresis width of the switching stage A. Generally, as a first approximation the recovery or dead time and the time factor and the over-oscillation time respectively can be equally considered for all stages of a control installation, so that the partial values of the output magnitude switched by the individual switching stages determine the switching-in and switching-out values of the switching stages, and the switching-in and switching-out value of a switching stage assumes a value which is greater or lower respectively than the switch-in and switch-out value of such preceding stage, by an amount which is proportional to the partial value of the output magnitude of the respective momentarily preceding stage. Due to these considerations there can be derived for the hysteresis widths of the switching stages of a stepwise control the equation:

$$\Delta x_n = \Delta x_1 + c \sum_{1}^{n-1} P_v \qquad (1)$$

in which $n = 2,3,4 \ldots$ the switching stage number, $\Delta x_1$ the hysteresis width of the first switching stage, $P_v$ the partial value of the output magnitude switched by a switching stage and $c$ represents a constant which is dependent upon the parameters of the control system.

With progessively increasing partial values of the output magnitudes for switching stage to switching stage the switching-in and switching-out values also progressively increase and decrease respectively. Instead of such, in many instances, it would also be possible to select for the stepwise control hysteresis widths which increase by the same amount from switching stage to switching stage, for which there could also be derived the equation:

$$\Delta x_n = \Delta x_1 + (n-1)d \quad (n=2,3,4 \ldots) \qquad (2)$$

wherein, the value $d$ is a constant. The switching-in and switching-out values of the switching stages then increase and decrease respectively, by the same amount $d/2$ from stage to stage, wherein the constant value $d/2$ at least must be somewhat greater than the greatest (positive or negative) over-oscillation width which occurs at the switching stages.

Figure 5:
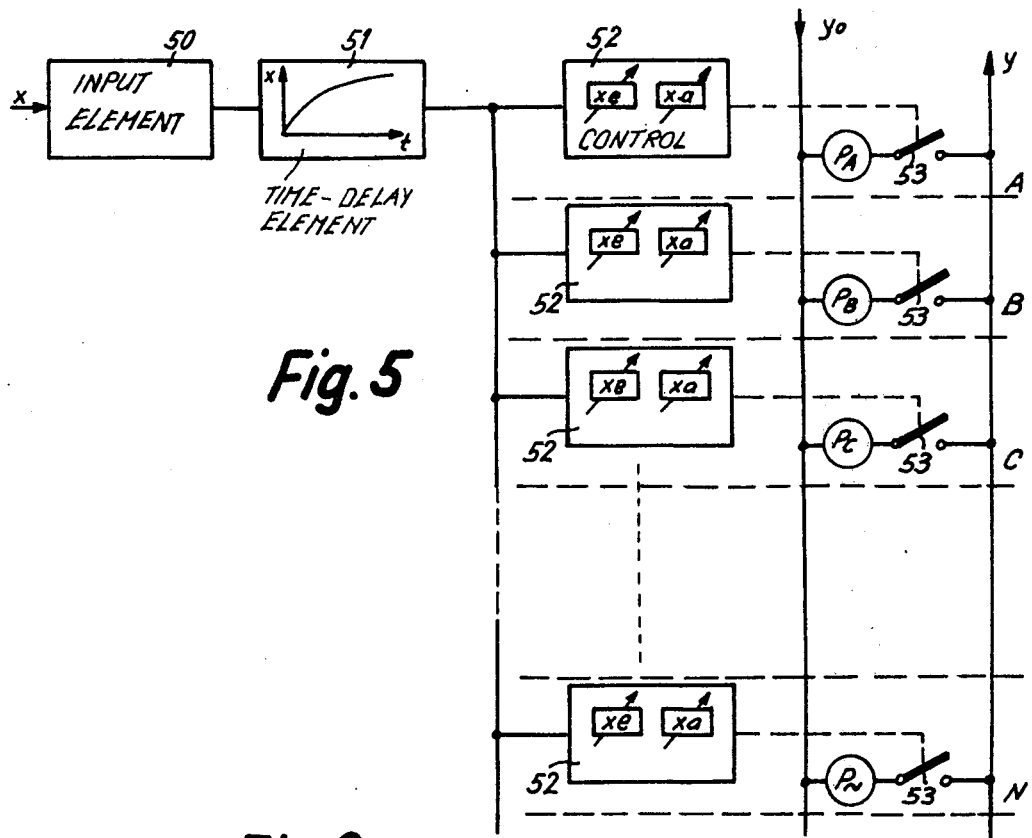
FIG. 5 illustrates in the form of a block circuit diagram the principal constructional features of a stepwise control according to the invention with a number of switching stages, a common input element for the switching stages and, if desired, a time-delay element in circuit between the input element and the switching stages.

It is apparent that with a stepwise control of pregiven number of stages, for instance with a temperature control, it is possible to determine the different adjustment regions and control widths, wherein the control can be readily accommodated, in a most easy fashion, to the individual switching stages and/or change in the values of the input magnitudes for switching-in and switching-out the switching stages by changing the distribution of the output magnitude, such accommodation being with respect to the momentarily arising factors and there is thus realized a satisfactory control. Such stepwise control is preferably equipped with a number of similar switching stages, the point of switching-on and switching-out of which can be adjusted, wherein the switching stages are coupled to a common input element for the infeed of the input magnitude. FIG. 5 illustrates in block circuit diagram the constructional principles of such stepwise or stage switch. Each switching stage A,B,C, ... N ... contains a switching device 53 which has been portrayed in such Figure by a switch symbol, and a control device 52 for actuating the switching device, which responds to the input magnitude $x$. The input magnitude $x$ is delivered from an input element 50 and, if desired, through the agency of a time-delay element 51, to the respective inputs of the control devices 52. At each control device 52 there can be adjusted the cut-on or switch-on point $x_e$ and the cut-off or switch-off point $x_a$.

Figure 6:
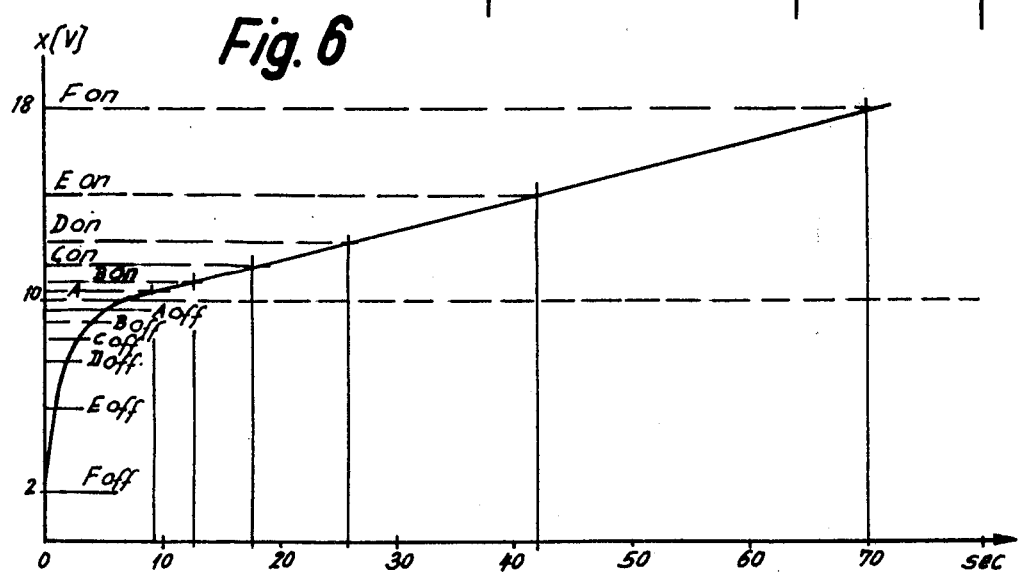
FIG. 6 illustrates the characteristic line of a time-delay element.

With the preceding described example of temperature control, upon switching-in the stepwise control, all six switching stages are simultaneously switched-on and therefore the network is loaded with the total value of the output magnitude (24 kW). Sudden high loading of a supply conductor is generally not desired. Accordingly, there are situations in which during a sudden or jump-like change of the input magnitude $x$ for switching-on and/or switching-off a number of stages, such switching stages should not all be simultaneously actuated, rather in succession with a certain time spacing relative to one another. For this purpose there is employed the time-delay element 51, depicted in the block circuit diagram of FIG. 5. During a jump-like or sudden change of the input magnitude $x$ at the input of the time-delay element 51 the input magnitude $x$ at the output of such time-delay element reaches the final value first after a certain time lapse, so that the switching stages affected by the change of the input magnitudes, as required, are actuated in succession. Oftentimes the switching-in of the switching stages should occur only in steps at time intervals, which generally more or less correspond to the partial values of the output magnitude switched thereby, whereas the switching stages should be switched-out simultaneously or essentially at brief time intervals. FIG. 6 illustrates a time-delay element characterizing line for the described temperature control embodiment. There has been plotted along the abscissa of FIG. 5 the time in seconds and along the ordinate the input magnitude in volts. From the graph there can be seen that during a certain change of the input magnitude to a predetermined value the associated stages always switch. With a sudden change of the input magnitude from 0 to 20 volts the first switching stage A already switches-on after about 9 seconds and the last switching F after about 70 seconds.

In accordance with the block circuit diagram of FIG. 5 it is possible to construct different types of stepwise controls, such as for instance electrical or pneumatic stage controls.

Figure 7:
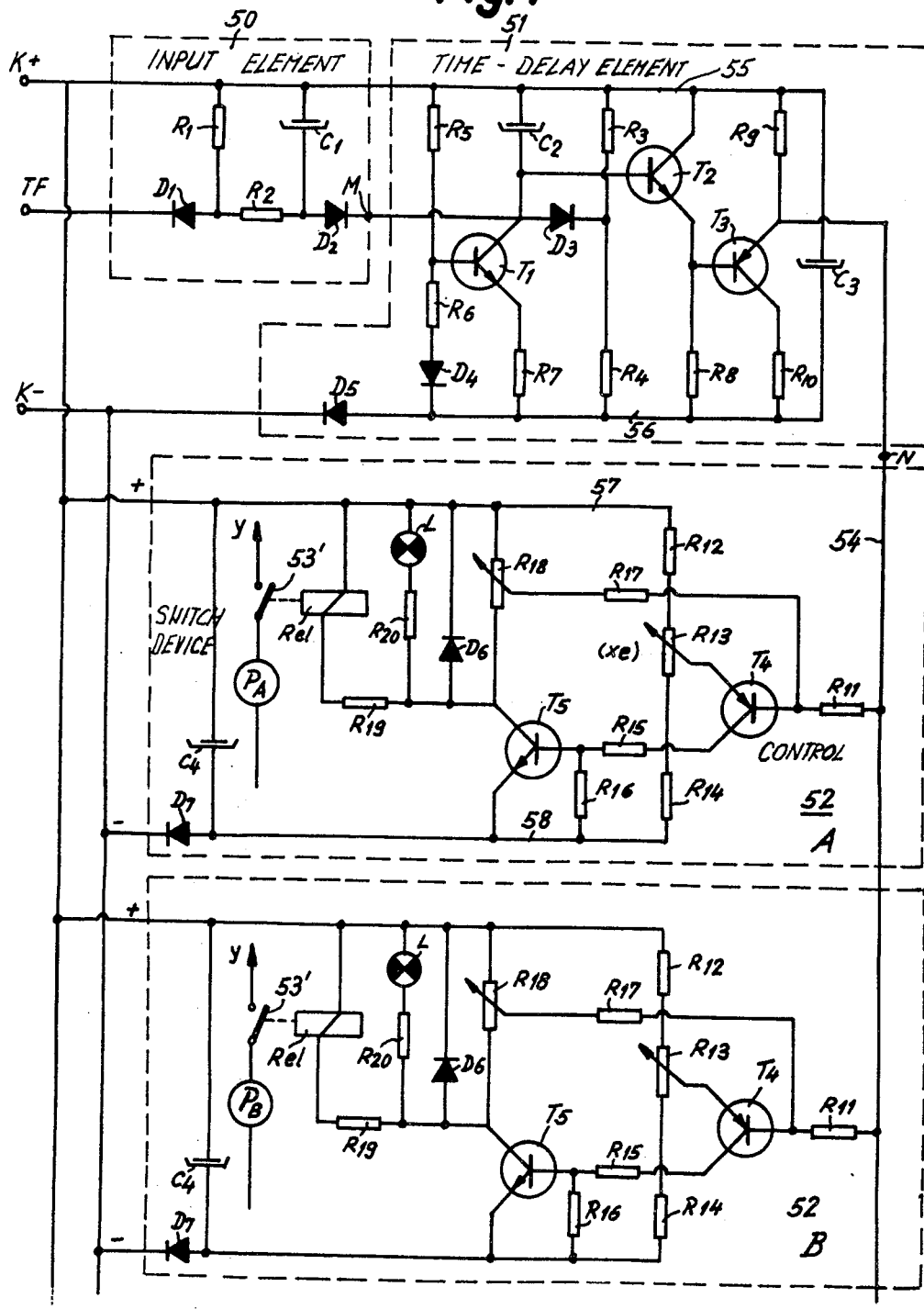
FIG. 7 is a detail circuit diagram, by way of example, of an electrical stepwise control designed according to the block circuit diagram of FIG. 5 with a respective electromagnetic switching device at each switching stage and control devices for the switching devices, which control devices are responsive to an electrical potential as the input magnitude.

FIG. 7 illustrates a circuit diagram of a preferred construction of electrical stepwise control. The illustrated stepwise control possesses an input element 50, a transistorized time-delay element 51, and a number of switching stages of identical construction, wherein in FIG. 7 only both of the first stages A and B have been illustrated as a matter of convenience. Each switching stage contains an electromagnetic switching device, a protective relay or a relay, with the winding Rel and the work contact 53', which are capable of switching-in and switching-out a respective heating winding for instance of a certain power wherein the power of the momentary heating winding represents the partial values $P_A$ and $P_B$ respectively of the output magnitude $y$ for the relevant stage, and further a transistorized control device 52 for actuating the electromagnetic switching device, which responds to a DC-voltage as the input magnitude $x$. The circuit arrangement is designed for an operating voltage of for instance 20 volts, removed from the terminals K+ and K− of a suitable DC-voltage source.

The input element 50 has the function of forming from signal voltage delivered by a regulation device provided at the control installation the control voltages required by the control devices of the switching stages. Conventionally employed are generally regulating or control devices which contain a thermistor as the temperature-sensitive element and can be adjusted to a reference value of the temperature to be regulated. Oftentimes such regulating devices function in accordance with the phase clipping principle, so that at their signal output there is delivered a pulsed DC-voltage, the amplitude of which is proportional to the control or regulating deviations. The input element 50 depicted in FIG. 7 is provided for such regulating device, and accordingly, contains as integration element an RC-low pass $C_1$, $R_1$, $R_2$, connected to the K+ terminal and coupled through the agency of a respective diode $D_1$ and $D_2$ with the signal output TF of the regulating device and with the output terminal M of the input element 50. At the output terminal M of the input element 50, there is obtained a direct current control voltage which, for instance, amounts to 10 volts for a control deviation null and for positive and negative control or regulating deviations thereof proportional voltage values between 10 and 0 volts and between 10 and 20 volts respectively.

The time-delay element 51 depicted in FIG. 7 is intended to bring about that, with a sudden increase of the input voltage, the voltage at the output, in accordance with the characteristic line depicted in FIG. 6, increases to the final value. The time-delay element 51 contains a Miller-integrator with an npn-transistor $T_1$, the associated work resistors $R_5$, $R_6$, $R_7$, the diode $D_4$ at the base and the capacitor $C_2$ at the collector of the transistor $T_1$. For impedance matching there is subsequently connected an emitter-follower which contains both transistors $T_2$ and $T_3$ and the associated work resistors $R_8$, $R_9$, $R_{10}$, wherein the base of its npn-input transistor $T_2$ is coupled with the collector of the integrator-transistor $T_1$ and the collector of the pnp-output transistor $T_3$ with the output terminal N of the time-delay element 51. The operating voltage is delivered to such circuit arrangement by means of a supply conductor 55 coupled with the K+ terminal and a supply conductor 56 connected via a diode $D_5$ with the K− terminal, with which supply conductors there is connected an additional smoothing capacitor $C_3$. The control voltage from the output terminal M of the input element 50 is delivered to the collector of the integrator-transistor $T_1$, which is coupled to the capacitor $C_2$ and with the base of the transistor $T_2$. Now, according to FIG. 6, in order to obtain, with a sudden change of the control voltage at the terminal M from 0 to 20 volts a voltage at the output terminal N of the time-delay element 51 which increases rather rapidly to the voltage value of 10 volts which encompasses the cut-off value of the switching stages and then only very slowly increases beyond the cut-on value of the switching stages up to the terminal value of 20 volts, the time-delay element contains a voltage divider incorporating the resistors $R_3$ and $R_4$. This voltage divider $R_3$ and $R_4$ is coupled to the two supply conductors 55 and 56, and further is designed for a voltage of about 10 volts at the center junction or terminal. The center terminal of the voltage divider $R_3$ and $R_4$ is connected via a diode $D_3$ with the collector of the integrator transistor $T_1$ and therefore also with the terminal M of the input element 50. The anode of the diode $D_3$ is coupled with the collector, so that, in the event of input voltages above 10 volts, there is provided an additional discharge path which leads via the diode $D_3$ and the resistor $R_4$ of the voltage divider to the supply conductor 56 (K−) and delivers the desired large delay for such voltage value.

In the illustrated exemplary embodiment the control device 52 of a switching stage consists of a two-stage transistor amplifier. The input stage contains a pnp-transistor $T_4$, the base of which is coupled via an input resistor $R_{11}$ and a signal input conductor 54 common to all switching stages A, B . . . with the output terminal N of the time-delay element 51. The operating voltage is received by the control device via supply conductors 57 and 58, wherein the conductor 57 is connected with the K+ terminal and the other conductor 58 is coupled via a diode $D_7$ with the K− terminal. A capacitor $C_4$ smooths the supply voltage. A voltage divider $R_{12}$–$R_{14}$ is coupled with the supply conductors 57 and 58 contains a potentiometer $R_{13}$, at the sliding tap of which there is connected the emitter of the transistor $T_4$. The collector of the transistor $T_4$ is connected via a resistor $R_{15}$ with the base of a npn-transistor $T_5$ of the output stage and via a further resistor $R_{16}$ with the supply conductor 58. The winding Rel of the electromagnetic switching device is connected in series together with a pre-resistor $R_{19}$ with the collector-emitter path of the output stage-transistor $T_5$. The collector of the transistor $T_5$ is coupled via the resistance path of a second potentiometer $R_{18}$ with the supply conductor 57 carrying the positive voltage. When the transistor $T_5$ is conductive, then the winding Rel is energized. In order to indicate this operating condition, a signal lamp L provided with a current limiting resistor $R_{20}$ can be connected between the supply conductor 57 and the collector of the transistor $T_5$. The sliding tap of the second potentiometer $R_{18}$ is coupled via resistor $R_{17}$ with the base of the transistor $T_4$ of the input stage.

Now at the first potentiometer $R_{13}$ there is adjusted the emitter voltage of the transistor $T_4$ of the input stage and therefore for the switching stage the switch-in value $x_e$, that is to say, there is fixed the amplitude of the input signal voltage at which the switching stage should turn- or switch-on, since the transistor $T_4$ becomes conductive when its base becomes more negative than its emitter. When the transistor $T_4$ becomes conductive, then also the transistor $T_5$ of the output stage becomes conductive and therefore energizes the winding Rel. With the transistor $T_5$ conductive, there appears at the second potentiometer $R_{18}$ almost the entire operating voltage and the base of the transistor $T_4$ receives a pre-bias which is dependent upon the setting of the potentiometer $R_{18}$. At the second potentiometer $R_{18}$ there is accordingly adjusted the width of the switching hysteresis $\Delta x$ of the switching stage. For each value of the input signal voltage greater than the switch-on value $x_e$ determined by the first potentiometer $R_{13}$, the switching stage remains switched-in, and by each value of the input signal voltage which is smaller than the switch-off value $x_a$ determined by the hysteresis width of the switching stage, the switching stage remains switched-off. If only relatively small electrical outputs or loads are switched by the switching stage, so that there occurs a sudden loading of the network with the entire output, then the time-delay element can be omitted and the signal input conductor 54 can be connected directly with the output of an input element 50 accommodated to the momentary control or regulating installation.

The previously described stepwise control is especially suitable for mass-production, wherein the switching stages, the input element and, if desired, the time-delay element can be combined in a housing and there can be provided at the housing terminals for connecting the heating windings for instance. For the partial values of the output magnitude which are to be connected to the individual switching stages, in this case for the heating windings or coils which are to be connected, there are generally sufficient guidelines and instructions, since especially with the higher switching stages, there are permissible quite large tolerances without impairing the control behavior of the stepwise control or regulator. As has been clearly explained heretofore by continually switching-in and switching-out there can be controlled the first switching stage with the smallest hysteresis width and the smallest partial value of the output magnitude. For such first switching stage, there is advantageously adjusted at both potentiometers $R_{13}$ and $R_{18}$ the switch-in value $x_e$ and the hysteresis width $x_A$ in such a manner that the value of the input magnitude for the control deviation null, which in the preceding exemplary embodiment has been assumed to be 10 volts, is located in the middle between the cut-on or switch-in value $x_e$ and the cut-off or switch-out value $x_a$ of the switching stage A. As a result, there is obtained a constant proportionality deviation which is constant throughout the total adjustment range of the stepwise control. For the control behavior of the stepwise control, the setting of the potentiometer to the correct values for $x_e$ and $x$ is considerably more critical than the correlation of the partial values of the output magnitude, so that the stepwise control advantageously can be calibrated at the place of manufacture.

While there is shown and described present preferred embodiments of the invention, it is to be distinctly understood that the invention is not limited thereto, but may be otherwise variously embodied and practiced within the scope of the following claims.

Accordingly, what is claimed is:

1. A stepped control system for two-point control, comprising:
    input means delivering an input signal characteristic for a control magnitude;

a plurality of two-point switching devices connected with said input means, each switching device including: on-off switch means having connections for a load; excitation means cooperating with said on-off switch means, said excitation means being responsive to said input signal for switching on and switching off the switch means at a first and a second level of said input signal; and control means determining the first and the second input signal level by fixing a switching-on and a switching-off response threshold for said excitation means, the difference between the switching-on and the switching-off threshold defining a switching hysteresis-width of the switching device;

said switching devices have hystersis-widths which differ from one another and have switching-on and switching-off thresholds which respectively increase and decrease for the different switching devices according to the sequence of their increasing hysteresis-widths; and a plurality of loads connected separatively to said on-off switch means of said plurality of switching devices, each load having a predetermined strength, whereby with the first switching device having the smallest hysteresis-width there is connected a first load of a certain smallest strength, with the second switching device having the next greater hysteresis-width there is connected a second load of the same strength as the first load, and with each further switching device having a greater hysteresis-width there is connected a further load the strength of which is not greater than the sum of strengths of loads connected with the switching devices preceding said further switching device.

2. A system as defined in claim 1, wherein the second and each further switching device of the sequence has the hysteresis-width thereof increasing by a constant value from device to device, and wherein the switching-on thresholds and the switching-off thresholds of such devices respectively increase and decrease by a constant amount from device to device in the sequence of their hysteresis-widths.

3. A system as defined in claim 1, wherein for the second and each further switching device the hysteresis-width increases from device to device by an amount proportional in each instance to the strength of load switched by the preceding switching device, and wherein the switching-on thresholds and also the switching-off thresholds of such devices increase and decrease respectively by an amount proportional to the strength of load switched by the preceding switching device.

4. A system as defined in claim 1, wherein both of the first two switching devices in the sequence of increasing hysteresis-widths each switch a load of the certain smallest strength and wherein with each further switching device in the sequence of increasing hysteresis-widths there is connected a load the strength of which is equal to the sum of strengths of loads connected with the switching devices preceding said further switching device.

5. A stepped control system for two-point control, comprising:

input means delivering an input signal characteristic for a control magnitude;

an input element connected with said input means providing a control voltage, said control voltage having for a control deviation null, at which the actual value of the magnitude to be regulated is equal to the desired value, a certain average value, and for each positive and negative control deviation, at which the actual value of the magnitude to be regulated is respectively greater or smaller than the desired value, a value which in accordance with the momentary amount of the control deviation is greater respectively smaller or smaller respectively greater than the average value;

a plurality of two-point switching devices connected with said input element, each switching device including: on-off switch means having connections for a load; excitation means cooperating with said on-off switch means, said excitation means being responsive to said control voltage for switching on and switching off the switch means at a first respective second control voltage level; and control means connected in circuit relation with said input element and said excitation means determining the first and the second control voltage level by fixing a switching-on and a switching-off response threshold for said excitation means, the difference between the switching-on and the switching-off thresholds defining a switching hysteresis-width of the switching device;

said switching devices have hysteresis-widths which differ from one another and have switching-on and switching-off thresholds which respectively increase and decrease for the different switching devices according to the sequence of their increasing hysteresis-width; and a plurality of loads connected separatively to said on-off switch means of said plurality of switching devices, each load having a predetermined strength, whereby with the first switching device having the smallest hysteresis-width there is connected a first load of a certain smallest strength, with the second switching device having the next greater hysteresis-width there is connected a second load of the same strength as the first load, and with each further switching device having a greater hysteresis-width in the sequence of increasing hysteresis-width there is connected a further load the strength of which is equal to the sum of strengths of loads connected with the switching devices preceding said further switching device.

6. A system as defined in claim 5, wherein a time delay element is connected between the control means of the switching devices and the input element to permit the control voltage at inputs of said control means to respectively increase or decrease with a time delay during a sudden increase or decrease of the control voltage at the output of said input element and to actuate successively in time the switching devices affected by the change in the control voltage.

7. A system as defined in claim 6, wherein said time-delay element, for a sudden change of the control voltage for switching-on the switching devices, possesses a larger time delay than for a sudden change in the control voltage for switching-off the switching devices.

8. A system as defined in claim 5, wherein each switching device comprises: a relay having switch contacts and a excitation winding; control means having an input transistor with base, emitter and collector, a resistor for delivering to the base of the input transistor the control voltage, an output transistor connected in series with the input transistor, the collector-emitter path of the output transistor being electrically coupled in series with the excitation winding of the associated relay with terminals of an operating DC-current voltage source, the emitter voltage of said input transistor being adjustable by means of a first potentiometer coupled with said terminals in order to adjust for the switching device the switching-on threshold value of the control voltage, at which the input transistor and the output transistor become conductive and therefore energize the winding, the base voltage of the input transistor being adjustable by a second potentiometer connected in series with the collector-emitter path of the output transistor in order to adjust the hysteresis-width of the switching device via the base voltage of the input transistor tapped-off when the output transistor conducts.

* * * * *